Patented Oct. 21, 1952

2,614,988

UNITED STATES PATENT OFFICE 2,614,988

HYDROCARBON OILS CONTAINING S-ALKOXYMETHYL - O,O' - DIALKYLDI-THIOPHOSPHATES

Edwin O. Hook, Old Greenwich, Conn., and Philip H. Moss, Seldovia, Territory of Alaska, assignors to American Cyanamid Company, New York, N. Y., a corporation of Maine No Drawing. Original application March 26, 1948, Serial No. 17,396. Divided and this application August 18, 1949, Serial No. 111,083

6 Claims. (Cl. 252—46.6)

This invention relates to hydrocarbon oil compositions containing S-methylalkyl ether and thioether triesters of dithiophosphoric acid.

The O,O-diesters of dithiophosphoric acid are well known compounds, and are usually prepared by condensing alcohols or phenols with phosphorus pentasulfide. We have found that a novel class of dithiophosphoric acid triesters, which are hereinafter described as S-methylalkyl ether and thioether triesters, can be produced by condensing one or more aliphatic alcohols or aliphatic mercaptans with O,O-diesters of dithiophosphoric acid with the aid of formaldehyde as a condensing agent. We have also found that these new triesters are good antioxidants for hydrocarbon oils when used therein in relatively small quantities.

When a monohydric aliphatic alcohol or an aliphatic monomercaptan is used, or when a polyhydric alcohol or polymercaptan is employed in amounts such that only one molecular equivalent of dithiophosphoric acid diester and of formaldehyde is present for each molecular equivalent of the alcohol the reaction proceeds as follows:

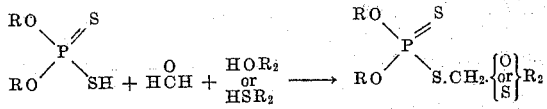

In these formulas each R is an aliphatic or aromatic radical and $R_2$ is an aliphatic radical, which term includes alkyl, cycloalkyl and aralkyl radicals as well as substituted aliphatic radicals as will hereinafter be more fully explained. When larger quantities of the dithiophosphoric acid diester and formaldehyde are reacted with an aliphatic polyhydric alcohol or polymercaptan the condensation takes place at each hydroxyl or mercapto group and a polydithiophosphoric acid triester is produced. This is best illustrated by the reaction between an O,O-dialkyl dithiophosphoric acid, formaldehyde, and ethylenediol or ethylenedithiol as follows:

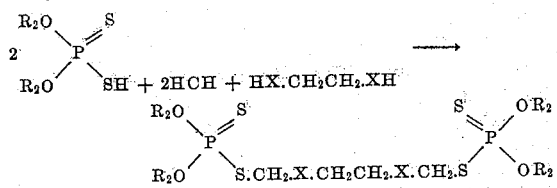

in which $R_2$ is an aliphatic radical and X is oxygen or sulfur.

The condensation reaction of our invention takes place when the reagents are mixed together at ordinary room temperature or at elevated temperatures up to 100° C. or higher; however, the use of temperatures above the boiling point of water is usually undesirable because the free dithiophosphoric acid tends to lose hydrogen sulfide. Accordingly, the process of our invention is preferably carried out by simply mixing the reagents together at room temperature or at slightly elevated temperatures for periods of time sufficient to complete the condensation reaction; usually within from about one hour to about 24 hours.

Any O,O-dialiphatic dithiophosphoric acid diester including the dicycloalkyl dithiophosphoric acid esters or any O,O-diaryl dithiophosphoric acid ester or any mixed O,O-diester of dithiophosphoric acid may be used in practicing the process of our invention and in producing the novel products thereof. When compounds having a relatively high percentage of combined phosphorus and sulfur are desired, as in the production of lubricating oil antioxidants having a high activity at relatively low temperatures which is sometimes required in turbine oils and anticorrosion oils, it is preferable to employ an O,O-dialkyl dithiophosphoric acid in which the alkyl groups are of relatively low molecular weight, such as methyl, ethyl, propyl, or butyl radicals. Dialkyl dithiophosphoric acids of higher molecular weight may of course be employed, such as diamyl, di-n-hexyl, dicyclohexyl or dioctyl dithiophosphoric acids, as well as the didecyl, didodecyl, ditetradecyl or dioctadecyl dithiophosphoric acids. The O,O-diaryl dithiophosphoric acids may frequently be used to advantage in the production of lubricating oil additives wherein the O,O-di-phenyl-, O,O-di-alkylphenyl-, and O,O-dinaphthyl dithiophosphoric acids may be employed. Still other diaryl dithiophosphoric acids may be used in the production of compounds for other purposes; thus, for example, in the production of insecticides and fungicides the use of O,O-dichlorphenyl or di-bromphenyl dithiophosphoric acids for condensation in accordance with the process of the invention is frequently advantageous. It will be understood that mixed O,O-dithiophosphoric acid diesters may also be employed, as where a mixed alkyl-phenyl dithiophosphoric acid is used to combine the oil-solubilizing properties of an aliphatic radical with the heat-stabilizing and sludge-inhibiting properties of the phenolic and particularly the alkylphenyl derivatives in a lubricating oil.

Any aliphatic mono- or polyhydric alcohol or mono- or polymercaptan may be used in practicing the process of our invention for the formation of the novel products thereof. Aliphatic monohydric alcohols which may be used include the saturated alkanols such as ethanol, methanol, etc. up to and including octadecanol, and either the straight-chain or branched-chain normal, secondary or tertiary alcohols may be used. The corresponding mercaptans of 1–18 or more carbon atoms may also be employed, or mixtures of alcohols and mercaptans may be used. Polyhydric alcohols and polymercaptans that may be employed include ethylene, propylene and butylene glycols, glycerol and higher polyhydric alcohols and the corresponding thiol compounds. Thioalkanols may also be used such as beta-mercaptoethanol, gamma-mercaptopropanol and the like. In general, therefore, it will be understood that any desired monohydric or polyhydric alcohol, or mono- or polymercaptan, or mixed mercapto alcohol of the aliphatic series may be used in practicing the process of our invention.

As is noted above, the condensation between the O,O-dithiophosphoric acid diesters and the monohydric or polyhydric aliphatic alcohol or mercaptan can be carried out simply by mixing these two reagents with formaldehyde. When monohydric alcohols or monomercaptans are used it is unnecessary to maintain any particular ratio of reacting ingredients, as the three reagents condense in equimolecular ratios; in fact it is frequently convenient to maintain an excess of alcohol or mercaptan present in the reaction to function as a diluent. Other non-reactive diluents such as volatile hydrocarbons of the type of benzene, toluene, solvent naphtha and the like may be used if desired. The condensation product is easily recovered from the reaction mixture in a purified form by washing with water or a dilute aqueous sodium carbonate solution, or both, followed by heating to 90–100° C. at reduced pressure to strip off volatile impurities. The purified products are liquids which are soluble in hydrocarbon solvents and in lubricating oils, including both the paraffin-base and naphthenic-base oils and possess good antioxidant and anti-corrosion properties therefor. They also possess good insecticidal and fungicidal properties and may be employed in the form of sprays, dusts, aerosols and the like for pest control purposes.

The novel products of the present invention are preferably used in lubricating oils in relatively small quantities which may vary from about 0.1% up to about 4–5% or greater, depending on the particular oil and on the degree of protection desired therein. In automobile engine lubricating oils, quantities on the order of 0.2% to 2–3% are usually incorporated into the oil. Our novel antioxidants are compatible with all of the commonly used detergents, stabilizers, sludge-inhibitors and other ingredients of compounded oils and may be used in conjunction with smaller or larger quantities of aliphatic or aromatic sulfonates such as calcium petronate, alkyl phenol sulfides such as p-p'-dibutyl-, diamyl- or dioctyl phenol mono- or polysulfides and their polyvalent metal salts, 2,4-dialkyl phenol mono- or polysulfides and their metal salts of oxygen- or sulfur-containing acids of phosphorus such as those described in U. S. Patents Nos. 2,364,284 and 2,228,658 and Reissue 22,829. These and other additives are usually employed in the oils in quantities of about 0.1–5%, most commonly in quantities of about 0.5–2%, in admixture with the antioxidants of the present invention.

The invention will be further illustrated in greater detail by the following specific examples. It should be understood, however, that although these examples may describe in detail some of the specific features of the invention, they are given primarily for purposes of illustration and the invention in its broader aspects is not limited thereto.

*Example 1*

A mixture of 600 grams (2.56 mols) of diethyldithiophosphoric acid and 230 grams (5 mols) of ethyl alcohol was prepared and 230 grams (2.8 mols) of 37% aqueous formaldehyde was added during 45 minutes. The reactants were stirred cold for 3 hours and then with warming on a steam bath for 3 hours longer. The product was separated from the water layer, washed twice with water, and stripped of volatiles by heating on a steam bath at a pressure of 20 mm. of mercury. A yield of 609 grams of a light-colored liquid was obtained. Analysis showed it to contain 26.8% sulfur (theory 26.4) and 13.2% phosphorus (theory 12.7). The product was easily soluble in lubricating oil.

A sample of the diethyl-S-ethoxymethyldithiophosphate so prepared was dissolved in an SAE 30 Mid-Continent base lubricating oil to an 0.5% solution together with 0.04% of iron naphthenate, based on the $Fe_2O_3$ equivalent, and the oil was subjected to the Underwood oxidation test. In this test 1500 cc. of the oil is heated for 10 hours at 325° F. in an open container providing free circulation of air while portions of the oil are sprayed continuously against two freshly sanded alloy bearings. When the silver-cadmium alloy bearings were used in the test with the above oil containing the iron naphthenate oxidation catalyst but no antioxidant the loss in weight due to corrosion was 1097 milligrams. With the same oil containing 0.5% by weight of the diethyl-S-ethoxymethyldithiophosphate there was no loss at all in the weight of the bearings.

Another sample of the same lubricating oil containing 0.5% of the additive was used in the "L–4" Chevrolet engine test, in which the engine is operated continuously for 36 hours at a 30 horsepower loading with a crankcase oil temperature of 280° F. and a water jacket outlet temperature of 200° F., and is then dismounted and the parts inspected and rated. The amount of varnish on the pistons is reported on a scale from 1 to 10, in which 10 means a perfectly clean piston and 1 means one which is very dirty with stuck piston rings. The overall rating is reported on a scale from 1 to 100, in which 100 means a clean engine with no sludge deposits and clean pistons. After the test run using the oil described above the piston varnish rating was 8.7, the overall rating was 96.2 and the bearing corrosion was 92 milligrams per bearing.

*Example 2*

A solution of 57.5 grams (0.71 mol) of 37% aqueous formaldehyde solution and 34 grams (0.74 mol) of ethyl alcohol to which 1 cc. of tenth-normal NaOH solution was added was stirred for ½ hour and then 150 grams (0.64 mol) of diethyldithiophosphoric acid was added during ½ hour. The stirring was continued at 25° C. for 20 minutes and then for 1 hour at 95° C., after which the reaction mixture stood overnight without stirring. The resulting water-insoluble layer was washed well with water and then with 5% aqueous sodium carbonate solution and again with water, and was stripped of volatiles by heating on a steam bath at reduced pressure. The yield was 59 grams of a light-colored liquid identical in its properties with the product of Example 1.

Example 3

A 75% solution of dimethyldithiophosphoric acid in benzene weighing 152 grams (0.72 mol) was mixed with 46 grams (1.46 mols) of methanol and the mixture was stirred while 60 grams (0.73 mol) of 37% Formalin was added and for an additional 4 hours. The product was washed with water, then with 5% sodium carbonate solution, and again with water and was heated under reduced pressure to remove volatiles. The yield was 118 grams of a light-colored liquid which on analysis was found to contain 14.4% of phosphorus and 34.2% of sulfur.

Example 4

A mixture of 69 grams (0.33 mol) of distilled diethyldithiophosphoric acid (neutralization equivalent 207) and 40 grams (0.67 mol) of n-propanol was prepared and 27 grams (0.33 mol) of 37% aqueous Formalin was added. The reactants were stirred without heating for 16 hours after which the lower layer was drawn off, washed with water, and stripped by heating on a steam bath at reduced pressure. The product was diethyl-s-n-propoxymethyldithiophosphate, a light-colored thin liquid that was soluble in lubricating oil. Analysis showed it to contain 24.9% of sulfur (theory 24.82%) and 12.9% of phosphorus (theory 12.01%).

Example 5

Twenty-five grams (0.3 mol) of 37% aqueous Formalin was added rapidly to a mixture of 71 grams (0.33 mol) of di-n-propyl dithiophosphoric acid having a neutralization equivalent of 236 and 36 grams (0.6 mol) of isopropanol. The mixture was stirred for several hours at room temperature and was then warmed for 4 hours longer. The water-insoluble product was washed with water and dried, whereby 78 grams of a tan-colored free-flowing liquid were obtained. This was the di-n-propyl-S-isopropoxymethyl dithiophosphate.

A sample of the product was dissolved in SAE 30 Mid-Continent base lubricating oil to a 0.5% solution which was subjected to the Underwood oxidation test as described in Example 1. There was no loss in weight by the silver-cadmium alloy bearings, indicating a complete lack of corrosion of the bearings by the oil.

Example 6

To a well stirred solution of 26 grams (0.56 mol) of ethyl alcohol and 73 grams (0.3 mol) of crude diisopropyl dithiophosphoric acid (neutralization equivalent 242) there was added 25 grams (0.31 mol) of 37% aqueous Formalin during ½ hour. The resulting mixture was agitated at room temperature for one hour and then on a steam bath for 4 hours. The upper water layer was removed and the organic layer was dissolved in ethylene dichloride and washed successively with water, with 5% aqueous sodium carbonate solution and again with water. The solvent and volatile impurities were removed by stripping the product on a steam bath under reduced pressure, whereby the isopropyl-S-ethoxy methyl dithiophosphate was obtained as a light-colored liquid that was easily soluble in lubricating oil. Analysis showed it to contain 11.02% of phosphorus and 29.9% of sulfur.

Example 7

The procedure described in Example 6 was repeated, but 35 grams (0.58 mol) of isopropanol was substituted for the ethyl alcohol and the reaction mixture was heated on the steam bath for 2.75 hours and then allowed to stand overnight. The purified product weighed 40 grams and was soluble in lubricating oil.

Example 8

A mixture of 50 grams (1.08 mols) of ethyl alcohol and 129 grams (0.5 mol) of crude di-n-butyl dithiophosphoric acid (neutralization equivalent 258) was stirred and 45 grams (0.55 mol) of 37% aqueous Formalin was added over a period of one hour. The composition was stirred without heating for 5 hours and then allowed to stand for 16 hours, following which the water-soluble layer was poured into a separatory funnel and washed well with water. The product after drying over calcium sulfate was stripped on a steam bath at 30 mm. of mercury pressure. The finished product weighed 148 grams and was a clear, light brown liquid, easily soluble in lubricating oil to a 50% solution. Analysis showed it to contain 22.3% of sulfur and 10.1% of phosphorus (theory 21.34% sulfur, 10.32% phosphorus).

When tested in an SAE Mid-Continent base lubricating oil by the Underwood oxidation test at 0.4 concentration the bearing loss was 3 mg. A second Underwood oxidation test of the same material in a Pennsylvania base oil (Penzoil) at 1% and 0.5% concentrations using silver-cadmium alloy bearings gave bearing loss values of 3 mg. and 9 mg., respectively.

Example 9

A mixture of 10 grams of methanol, 25 grams of 37% aqueous Formalin and 65 grams (0.25 mol) of crude di-isobutyl dithiophosphoric acid (neutralization equivalent 260) was stirred for 20 hours at room temperature and the oily product was washed with water and stripped at 95° C. under a vacuum. The product, which was di-isobutyl-S-methoxymethyl dithiophosphate, analyzed 11.8% phosphorus and 23.3% sulfur and was easily soluble in lubricating oil. When tested by the Underwood oxidation test at 0.5% concentration in Mid-Continent base SAE 30 oil the bearing loss was 8 mg.

Example 10

A mixture composed of 32 grams (0.4 mol) of 37% aqueous Formalin, 17 grams (0.53 mol) of methanol and 105 grams (0.33 mol) of di(methylisobutylcarbinyl)dithiophosphoric acid was reacted by stirring for 18 hours at room temperature. The oily reaction product was dissolved in benzene, washed thoroughly with water, and then stripped of solvent and volatile impurities by heating on a steam bath under reduced pressure. The yield was 108 grams of a thin, dark, clear liquid that contained 9.38% phosphorus and 19.7% sulfur and was easily soluble in lubricating oil. There was no loss in weight of the silver-cadmium bearings when a Mid-Continent oil containing 0.5% of the material was subjected to the Underwood test as described in Example 1.

Example 11

A mixture composed of 69 grams (0.32 mol) of distilled diethyl dithiophosphoric acid (N. E. 207), 30 grams (0.37 mol) of 37% aqueous Formalin and 60 grams (0.81 mol) of n-butanol was stirred without heating for 7 hours, after which the product was recovered and purified as in previous examples. Ninety-two grams of a clear colorless liquid were obtained which was the diethyl-S-n-butoxymethyl dithiophosphate. It contained 11.9% of phosphorus (theory 11.4%) and 22.9% of sulfur (theory 23.5%).

*Example 12*

A mixture of 105 grams (0.33 mol) of dimethylisobutylcarbinyl dithiophosphoric acid, 32 grams (0.4 mol) of 37% aqueous Formalin and 50 grams (0.68 mol) of n-butanol was stirred for 8 hours at room temperature and the crude product was washed, dried and stripped on a steam bath at reduced pressure. By this reaction there was obtained 119 grams of a thin oily product which was the di(methylisobutylcarbinyl)-S-n-butoxymethyl dithiophosphate.

*Example 13*

A mixture of 40 grams of "B–24 alcohol" (see U. S. Patent No. 2,368,000), 30 grams of n-decanol, 20 grams of p-octylphenol and 10 grams of methylisobutyl carbinol was reacted with 41 grams of $P_2S_5$ at 95° C. for about 2½ hours and the resulting dithiophosphoric acid diester was filtered.

A portion of the above product weighing 103 grams (0.25 mol) was mixed with 10 grams (0.31 mol) of methanol and 24 grams (0.28 mol) of 37% aqueous Formalin and the mixture was stirred for 5 hours. The product was washed with water and stripped under reduced pressure on a steam bath to yield 109 grams of a dark-colored, moderately viscous liquid that was easily soluble in lubricating oil. Its analysis was 7.43% phosphorus and 15.4% sulfur. When tested by the Underwood oxidation test at 0.5% concentration in Mid-Continent base oil against silver-cadmium bearings, the bearing weight loss was 5 mg.

*Example 14*

A mixture of 46 grams (0.5 mol) of "Pentasol" (a mixture of isomeric amyl alcohols) with 52 grams (0.25 mol) of distilled diethyl dithiophosphoric acid (N. E. 207) was reacted with 23 grams (0.26 mol) of 37% aqueous Formalin by stirring on a steam bath for 3 hours. Benzene was then added and the benzene layer was washed with water and then with dilute sodium carbonate solution followed by filtration and a final shaking with water. The benzene solution was then stripped at 95° C. under 10 mm. of mercury pressure, whereby a yield of 42 grams of diethyl-S-amyloxymethyl dithiophosphate was obtained in the form of a light-colored liquid.

*Example 15*

Twenty-two and eight-tenths grams (0.1 mol) of diphenyl dithiophosphoric acid was dissolved in 40 cc. (0.7 mol) of ethyl alcohol and 8.2 grams (0.1 mol) of 37% aqueous formaldehyde solution was added with stirring. The mixture was heated to reflux temperature on a steam bath for 2½ hours, after which the colorless clear solution was stripped by heating at reduced pressure, cooled and washed with water. Ethylene dichloride was then added as a solvent and the product was washed with dilute potassium carbonate solution and then twice more with water. The ethylene dichloride was removed by distillation under reduced pressure, leaving 24 grams of a colorless product. It was the diphenyl-S-ethoxymethyl dithiophosphate.

*Example 16*

Eighteen grams (0.2 mol) of secondary butanol was mixed with 25 cc. of benzene and 28.2 grams (0.1 mol) of diphenyl dithiophosphoric acid was added followed by 10 grams (0.25 mol) of aqueous formaldehyde solution. The reactants were stirred together for 5 hours and then allowed to stand overnight. The non-aqueous layer was washed twice with water and then heated at reduced pressure to yield 36 grams of a light-colored liquid which was the diphenyl-S-sec.-butoxymethyl dithiophosphate.

*Example 17*

In 30 cc. of dioxane was dissolved 22 grams (0.3 mol) of n-butanol and 43 grams (0.21 mol) of crystalline diphenyl dithiophosphoric acid (N. E. 207) with slight warming. To this was added 13 grams (0.16 mol) of 37% aqueous Formalin and the mixture was stirred on a steam bath for 4 hours. The product was washed with water, with dilute aqueous sodium carbonate and again with water. It was then dried and stripped by heating under reduced pressure, yielding 36 grams of diphenyl-S-n-butoxymethyl dithiophosphate which was a thin liquid.

*Example 18*

By reacting equimolecular quantities of formaldehyde and betapinene (nopinene) a methylolpinene is produced which is called nopol and has the formula

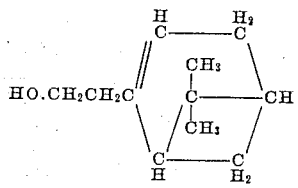

This material is easily converted to the corresponding saturated compound, called hydronopol, by hydrogenation.

Forty-two grams of nopol were mixed with 52 grams (0.25 mol) of distilled diethyldithiophosphoric acid (N. E. 208) and 25 grams (0.31 mol) of 37% aqueous formaldehyde was slowly added. Stirring was continued for 6½ hours after which the mixture was allowed to stand overnight. The lower layer was then dissolved in ethylenedichloride, washed with water, and stripped of solvent under reduced pressure. The product was 91 grams of a water white, slightly viscous liquid that was easily soluble in lubricating oil. Analysis showed it to contain 8.4% of phosphorus and 16.3% of sulfur.

The same procedure was repeated, using the same quantities of reagents but substituting hydronopol for nopol. A yield of 89 grams of a product similar in appearance and properties was obtained. The compositions of the two products are shown by the following formulas:

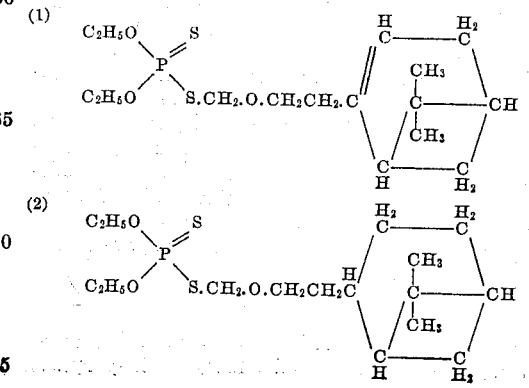

Example 19

A mixture of 44 grams (0.53 mol) of 37% Formalin, 17 grams (0.26 mol) of ethylene glycol and 105 grams (0.51 mol) of distilled diethyldithiophosphoric acid (N. E. 207) was stirred for 6 hours at room temperature. The reaction product was washed three times with water and then freed of volatiles under reduced pressure on a steam bath. The yield was 99 grams of 1,2-bis(O,O- diethyldithiophosphatomethoxy)ethane, a colorless liquid. The product has the formula:

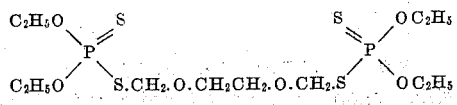

Example 20

A mixture of 79 grams (0.37 mol) of distilled diethyldithiophosphoric acid (N. E. 213) and 33 grams (0.36 mol) of tertiary butylmercaptan was stirred and 33 grams (0.4 mol) of 37% aqueous formaldehyde was added. The stirring was continued for 2½ days at room temperature after which the water-insoluble layer was washed thoroughly with water, then with dilute aqueous sodium carbonate solution, and again with water. After stripping by heating at reduced pressure the product weighed 105 grams and was a colorless, thin liquid that was soluble in lubricating oil.

A sample of the diethyl-s-t-butylthiomethyldithiophosphate so prepared was dissolved in SAE 30 Mid-Continent base lubricating oil to an 0.5% solution which was subjected to the Underwood oxidation test, using cadmium-silver alloy bearings. The corrosion loss was 6 milligrams.

Another sample of the 0.5% oil solution was subjected to the standard "L-4" Chevrolet engine test described in Example 1. The overall rating was 97.1 and the piston varnish rating was 9.0, showing that the additive possessed good antioxidant and sludge-inhibiting properties.

Example 21

A mixture of 15 grams (0.167 mol) of tertiary butylmercaptan, 40 grams (0.167 mol) of di-n-propyldithiophosphoric acid (distilled, N. E. 241) and 15 grams (0.185 mol) of 37% aqueous formaldehyde was stirred at room temperature for 16 hours. The oily lower layer was washed with aqueous sodium carbonate solution and then with water, and dried on a steam bath under reduced pressure. The product, weighing 33 grams, was di-n-propyl-s-t-butylthiomethyldithiophosphate, a thin, colorless liquid.

The same procedure was repeated using an equivalent quantity of di-isobutyldithiophosphoric acid instead of the n-propyl diester, except that the stirring was continued for 20 hours. The product, weighing 163 grams, was soluble in lubricating oil. An 0.5% solution in SAE 30 oil gave a bearing corrosion loss of 11 milligrams when subjected to the Underwood oxidation test.

Example 22

To a mixture of 31 grams (0.3 mol) of mixed amylmercaptan and 52 grams (0.25 mol) of distilled diethyldithiophosphoric acid there was added 23 grams (0.29 mol) of 37% Formalin during 20 minutes. Stirring was continued at 90° C. for 4 hours after which the non-aqueous layer was washed well with water and stripped of volatiles by heating under reduced pressure. The product, diethyl-S-amylthiomethyldithiophosphate, was obtained as a thin, colorless liquid weighing 74 grams. Upon analysis it was found to contain 31.2% of sulfur (theory 31.8%) and 9.39% phosphorus (theory 10.27%).

An 0.5% solution of the product in SAE 30 Mid-Continent base lubricating oil was tested by the Underwood oxidation test, using cadmium-silver alloy bearings. There was no loss in weight of the bearings, indicating no corrosion.

Example 23

A mixture of 50 grams (0.232 mol) of distilled diethyldithiophosphoric acid and 34 grams (0.24 mol) of n-octylmercaptan was stirred and 19 grams (0.24 mol) of 37% Formalin was slowly added. After agitating for 16 hours at room temperature the product was purified as described in Example 21. A yield of 69 grams of diethyl - S - n-octylthiomethyldithiophosphate, a water-white liquid, was obtained. Lubricating oil containing 0.5% of the product showed a bearing corrosion loss of 5 milligrams when subjected to the Underwood oxidation test and also passed the Chrysler heat stability test, which is conducted by heating 200 cc. of the oil in a 400 cc. open glass beaker at 250° F. for 125 hours, then allowing the beaker containing the oil to stand for 24 hours at room temperature, and examining for sludge formation.

Example 24

Following the procedure described in Example 21, the di-n-butyl-s-t-butylthiomethyldithiophosphate was prepared from 37 grams (0.41 mol) of tertiary butylmercaptan, 110 grams (0.41 mol) of di-n-butyldithiophosphoric acid and 36 grams (0.43 mol) of Formalin. The product, weighing 74 grams, was a thick, clear, dark-colored liquid that was soluble and heat-stable in lubricating oil. It contained 9.3% phosphorus and 26.27% sulfur.

Example 25

To a mixture of 39 grams (0.5 mol) of 2-mercaptoethanol and 134 grams (0.5 mol) of di-n-butyldithiophosphoric acid there was added 44 grams (0.454 mol) of 37% Formalin and the mixture was stirred for 16 hours. After washing with water, sodium carbonate solution, and again with water and stripping of volatiles there was obtained 81 grams of a product of the formula:

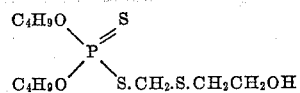

It was a light tan liquid that was soluble and heat-stable in lubricating oil. Analysis showed it to contain 10% of phosphorus and 27.1% of sulfur.

Example 26

A mixture of 19 grams (0.25 mol) of beta-mercaptoethanol and 135 grams (0.5 mol) of di-n-butyldithiophosphoric acid was prepared and 44 grams (0.54 mol) of 37% aqueous Formalin was added rapidly. The mixture was stirred for 16 hours, after which the non-aqueous layer was washed three times with water and stripped on a steam bath at 20 mm. of mercury pressure. The yield was 143 grams of O,S-bis(O,O-di-n-butyldithiophosphatomethyl)mercaptoethanol a clear, light tan-colored liquid of the formula:

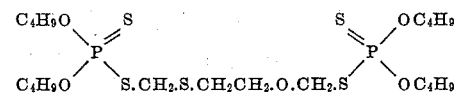

An 0.5% solution of this compound in SAE 30 Mid-Continent base lubricating oil was subjected to the Underwood oxidation test. The weight loss of the silver-cadmium bearings was 2 milligrams.

This is a division of our copending application Serial No. 17,396, filed March 26, 1948, now Patent No. 2,586,655.

What we claim is:

1. A hydrocarbon oil composition comprising a major amount of a hydrocarbon oil having dissolved therein a relatively small amount, sufficient to prevent deterioration by oxidation, of a triester of dithiophosphoric acid having the formula

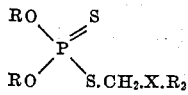

in which X is a member of the group consisting of oxygen and sulfur, $R_2$ is an aliphatic radical, and each R is a member of the group consisting of aliphatic and aromatic radicals.

2. A hydrocarbon oil composition comprising a major amount of a hydrocarbon oil having dissolved therein a relatively small amount, sufficient to prevent deterioration by oxidation, of a triester of dithiophosphoric acid having the formula

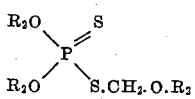

in which each $R_2$ is an aliphatic radical.

3. A hydrocarbon oil composition comprising a major amount of a hydrocarbon oil having dissolved therein a relatively small amount, sufficient to prevent deterioration by oxidation, of a triester of dithiophosphoric acid having the formula

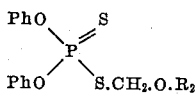

in which each Ph is a phenyl radical.

4. A hydrocarbon oil composition comprising a major amount of a hydrocarbon oil having dissolved therein a relatively small amount, sufficient to prevent deterioration by oxidation, of a triester of dithiophosphoric acid having the formula

in which each $R_2$ is an aliphatic radical.

5. A hydrocarbon oil composition comprising a major amount of a hydrocarbon oil having dissolved therein a relatively small amount, sufficient to prevent deterioration by oxidation, of a bis-triester of dithiophosphoric acid of the formula

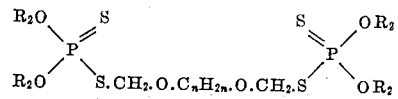

in which each $R_2$ is an aliphatic radical and $n$ is a whole number.

6. A hydrocarbon oil composition comprising a major amount of a hydrocarbon oil having dissolved therein, in a sufficient amount to prevent deterioration by oxidation, a condensation product having the formula

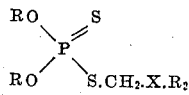

in which X is a member of the group consisting of oxygen and sulfur, each R is a member of the group consisting of aliphatic and aromatic radicals, and $R_2$ is a member of the group consisting of aliphatic radicals and dithiophosphoric acid triesters of the formula

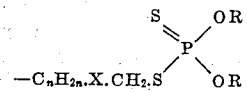

in which X and R are as defined above and $n$ is a whole number.

EDWIN O. HOOK.
PHILIP H. MOSS.

REFERENCES CITED

The following references are of record in the file of this patent:

UNITED STATES PATENTS

| Number | Name | Date |
| --- | --- | --- |
| 2,063,629 | Salzberg | Dec. 8, 1936 |
| 2,415,833 | Mikeska | Feb. 18, 1947 |
| 2,441,496 | Lincoln | May 11, 1948 |
| 2,528,732 | Augustine | Nov. 7, 1950 |